(12) United States Patent
Pritchard

(10) Patent No.: US 8,657,554 B1
(45) Date of Patent: Feb. 25, 2014

(54) MATERIAL HANDLING AND TRANSPORT SYSTEM

(76) Inventor: Cory Pritchard, Prescott, AZ (US)

( * ) Notice: Subject to any disclaimer, the term of this patent is extended or adjusted under 35 U.S.C. 154(b) by 679 days.

(21) Appl. No.: 12/656,599

(22) Filed: Feb. 4, 2010

Related U.S. Application Data

(60) Provisional application No. 61/202,217, filed on Feb. 6, 2009.

(51) Int. Cl.
*B60P 1/48* (2006.01)
*B66F 9/16* (2006.01)

(52) U.S. Cl.
USPC ............ 414/541; 187/225; 212/294; 414/634

(58) Field of Classification Search
USPC ................. 414/541, 549, 540, 629, 632, 634; 187/225; 212/294
See application file for complete search history.

(56) References Cited

U.S. PATENT DOCUMENTS

| | | | | |
|---|---|---|---|---|
| 2,682,957 A | * | 7/1954 | Holmes | 212/300 |
| 3,092,367 A | * | 6/1963 | Selby | 254/326 |
| 3,207,338 A | * | 9/1965 | Felburn | 414/708 |
| 3,261,485 A | * | 7/1966 | Anderson | 414/718 |
| 3,521,780 A | * | 7/1970 | Cook | 414/632 |
| 3,567,056 A | * | 3/1971 | Mason | 414/708 |
| 3,804,207 A | * | 4/1974 | Stonebraker et al. | 187/225 |
| 3,966,064 A | * | 6/1976 | Felburn | 414/708 |
| 4,078,818 A | * | 3/1978 | Donnelly | 280/418.1 |
| 4,325,666 A | * | 4/1982 | Chain et al. | 414/24.5 |
| 4,778,327 A | * | 10/1988 | Tufenkian et al. | 414/541 |
| 4,790,711 A | * | 12/1988 | Calaway | 414/635 |
| 4,948,326 A | * | 8/1990 | Bedard | 414/541 |
| 5,662,450 A | * | 9/1997 | Roberts | 414/347 |
| 7,029,226 B2 | * | 4/2006 | Walsh | 414/812 |
| 7,351,027 B2 | * | 4/2008 | Ruch | 414/540 |

FOREIGN PATENT DOCUMENTS

FR 2615157 A1 * 11/1988 ............ 414/541

\* cited by examiner

*Primary Examiner* — James Keenan
(74) *Attorney, Agent, or Firm* — Dowell & Dowell, PC

(57) ABSTRACT

A combination transport and load handling vehicle that includes a truck having a chassis with a cab mounted to a forward portion of the chassis and a hitch plate mounted toward the rear of the chassis and a forklift assembly pivotally mounted to the chassis intermediate the cab and the hitch plate so that arms of the forklift are movable from a stowed position above the cab to a deployed position extending rearwardly of the chassis when no trailer is connected to the hitch plate. The forklift assembly has a lift frame including a boom pivotally mounted to the chassis and which supports a forklift tower along which the arms of the forklift device are movable adjustable.

14 Claims, 4 Drawing Sheets

MATERIAL HANDLING AND TRANSPORT SYSTEM

CROSS REFERENCE TO RELATED APPLICATIONS

This application claims the benefit of, and is a non-provisional application of, provisional application Ser. No. 61/202,217, filed Feb. 6, 2009, in the name of the same inventor.

BACKGROUND OF THE INVENTION

1. Field of the Invention

The present invention is directed to material handling and transporting systems and equipment and more particularly to multi-purpose vehicles that may be used both for transport goods and materials and also for loading and unloading such goods and materials without the need for other equipment.

2. Brief Description of the Related Art

The are a number of material handling systems and vehicles that have been designed and built to facilitate the transportation and loading and unloading of goods and materials in order to overcome the need for supplemental material handling equipment and personnel to load and unload goods and materials being moved in commerce. Unfortunately, many such systems and vehicles are specialty vehicles that have been modified for a particular task or purpose and thus are no longer functional for use as a conventional hauling vehicle, such as a flat bed truck or the like.

In view of the foregoing, it would be beneficial to develop a multi-purpose material transporting and handling vehicle that may be utilized in a conventional manner as a combination tractor-trailer and which, when the trailer is unhitched from the tractor, the tractor may be used as a material handling vehicle having forklift capabilities.

SUMMARY OF THE INVENTION

A material handling and transport truck for use for both hauling or transporting materials to be delivered and loading and unloading materials as required. The truck includes a hitch plate or fifth wheel assembly mounted to a rear chassis thereof to which a conventional trailer may be secured such that the truck and trailer may be used to haul goods and materials. The trailer includes deployable support legs that are used to support the trailer when not in use and which are selectively extended to elevate the trailer to thereby permit the truck to be maneuvered to and from engagement with the trailer. The truck also includes a material handling system including a forklift assembly that is pivotally mounted between the truck cab and the hitch plate or fifth wheel assembly and which is operable using controls provided within the cab.

The material handling system includes a lift frame having a pair of spaced hollow guide boom members that are rigidly connected by cross braces and which are pivotally mounted to the truck chassis just to the rear of the truck cab so as to be forward of the hitch plate or fifth wheel assembly. At least one first hydraulic cylinder is secured to the rear of the pivot connection of the lift frame from which a telescoping piston rod extends to an outer end which is connected to the lift frame. The at least one first hydraulic cylinder is used to raise and lower the lift frame about the pivot mounting.

A pair of telescoping boom components are slidably mounted relative to the spaced guide boom members. Outer ends of the telescoping boom components are secured to a lower portion of a guide frame that is oriented transverse, and preferably perpendicular, to an elongated axis of the telescoping boom components. Extension and retraction of the telescoping boom components is controlled by one or more second hydraulic cylinders. In the embodiment shown in the drawings, a single second hydraulic cylinder has an end mounted to a cross brace of the lift frame and an opposite end from which a second extension or piston rod extends to an outer end connected to an attachment frame mounted to the guide frame. As the second piston rod is moved in and out relative to the second hydraulic cylinder, the attachment frame urges the telescoping boom components in and out.

The guide frame includes a pair of spaced rearward facing guide rails that are connected by a plurality of cross members. Mounted to the pair of guide rails is a slide base member to which is mounted a forklift device. The slide base member has a pair of spaced bearing journals in which an upper cross tube of a rear frame of the forklift device is pivotally mounted such that the forklift device is pivotally adjustable relative to the guide frame. The forklift device includes a pair of forks which may vary in configuration and which extend generally perpendicularly from opposing side components of the rear frame. The forklift device is movable along the spaced guide rails by at least one third hydraulic cylinder that is mounted to the outer frame that is secured to the outer ends of the boom components. Each third hydraulic cylinder has a third piston rod that is mounted to the slide base plate of the forklift device such that extension and retraction of the third piston rod moves the slide base plate relative to the side rails of the guide frame.

To control the pivoting motion of the forklift device relative to the guide frame, at least one fourth hydraulic cylinder is mounted to an extension of the sliding base member and has a fourth extension or piston rod mounted to the upper cross tube of the rear frame of the device. By extension and retraction of the fourth piston rod, the upper cross tube is pivoted within the journals of the sliding base plate such that the forks are pivoted relative to the guide frame.

In order to permit the forks to be maneuvered toward and away from one another, the side components are mounted to outer ends of at least two pair of opposing supports that are telescopically mounted within opposite ends of at least two cross tubes that are secured relative to one another by a brace. At least one fifth hydraulic cylinder has one end mounted to the brace and a fifth piston rod that is movable relative to the opposite end thereof and which has an outer end that is secured to one of the side components of the rear frame of the forklift device. By extending the fifth piston rod, the forks are moved outwardly relative to one another while being supported by the cross tubes. By withdrawing the fifth piston rod, the forks are moved relatively closer. The spacing of the forks will depend upon the load to be maneuvered relative to a trailer associated with the truck.

When the forklift device is not in use, it is positioned such that the forks are generally parallel to the guide frame and the guide frame is positioned perpendicularly relative to the guide tube members. As the at least one first hydraulic cylinder is activated to raise the guide boom members to a vertical orientation generally flush of a rear wall of the truck cab, the forklift device and the guide frame will be positioned above the roof of the cab and extending forward relative to the cab so as not to interfere with the normal use of hitch plate or fifth wheel assembly of the truck.

It is a primary object of the present invention to provide a multi-purpose transport and material handling vehicle wherein a forklift assembly is mounted to a truck chassis forward of the conventional hitch plate or fifth wheel assembly of the truck and just to a rear of the cab in such a manner that the forklift assembly may be placed into use whenever a trailer is not hitched to the hitch plate and such that the fork portions of the forklift assembly are pivotally movable above the truck cab when not in use to thereby make clearance for the connection of the conventional trailer to the hitch plate or fifth wheel assembly of the truck.

It is a further object of the present invention to provide a multi-purpose vehicle that can be used to haul goods and materials and which can also be used to load or unload such goods and materials without the need for supplemental article handling systems, devices or equipment.

It is yet another object of the invention to provide a combination material handling and transport truck that has a forklift assembly that is fully adjustable to facilitate the handling of varying sizes of goods and materials utilizing the hydraulics associated with a conventional tractor-trailer style of truck.

BRIEF DESCRIPTION OF THE DRAWINGS

A better understanding will be had with reference to the accompanying drawings wherein.

DESCRIPTION OF THE PREFERRED EMBODIMENT

Figure 9:
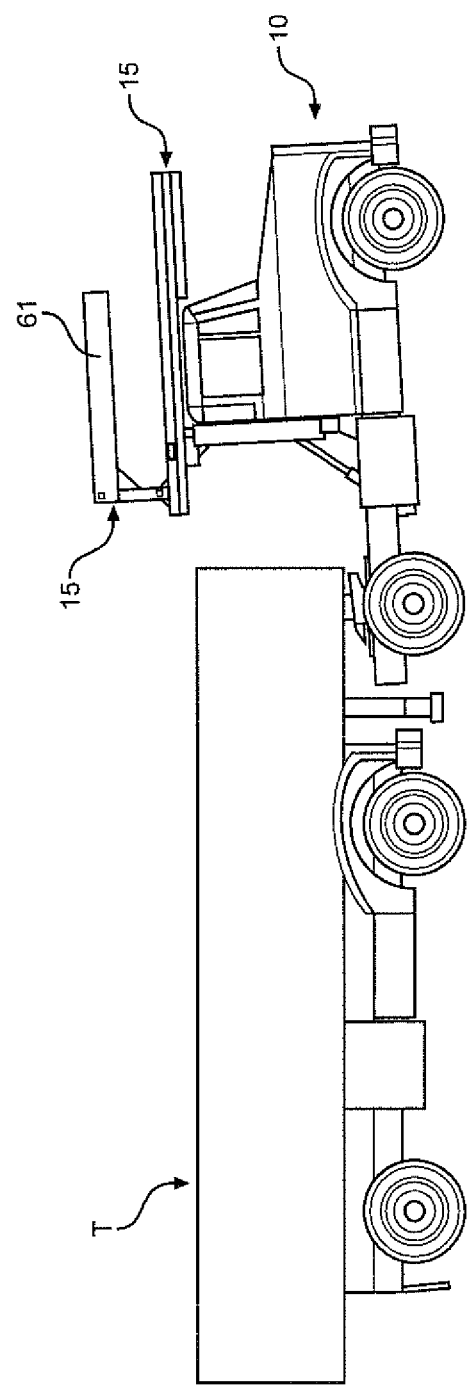
FIG. 9 is a side view of the truck and forklift assembly as shown in FIG. 1 with one type or style of conventional trailer connected to the truck.

With continued reference to the drawing figures, a truck 10 is shown having chassis or frame 11 on a front portion of which is mounted a cab 12 and on a rear portion of which is mounted a conventional hitch plate or fifth wheel assembly 13. The hitch plate is designed to receive a hitch pin associated with substantially any conventional trailer "T", see FIG. 9. One of the unique features of the present invention is that the truck may be used in combination with substantially any type of open or closed trailer to haul goods and materials and, when the trailer is disconnected from the truck, the truck can be used as a material handling vehicle. In this respect, mounted immediately behind the cab so as to be forward of the hitch plate is a forklift assembly 15.

Figure 1:
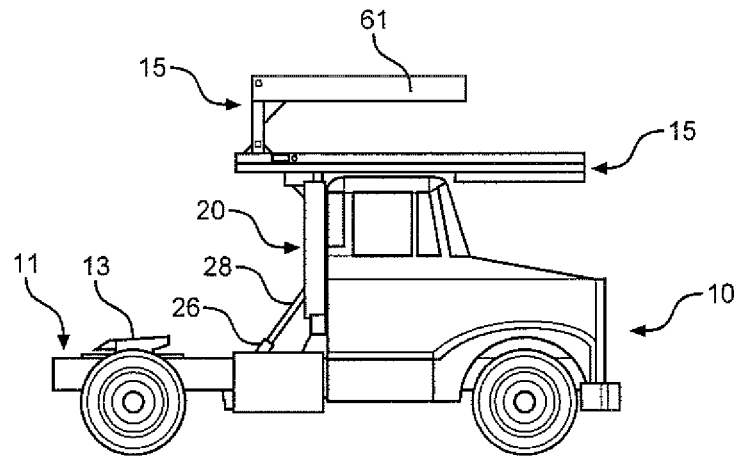
FIG. 1 is right side view of a multi-purpose truck and material handling system of the present invention showing a forklift device stored in a non-use position above a cab of the truck.
Figure 3:
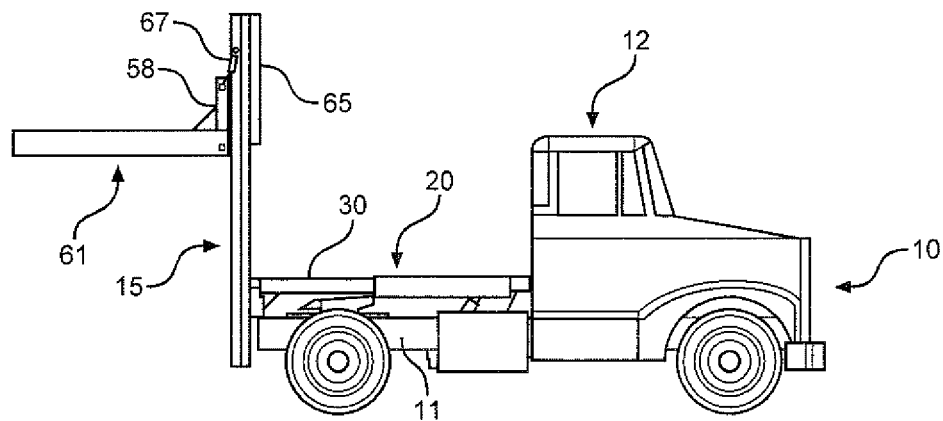
FIG. 3 is a view similar to FIGS. 1 and 2 showing the forklift device being lowered to a fully deployed and operative position but with the forks in a raised position.

The forklift assembly includes a lift frame 20 having a pair of hollow guide boom members 21 that are pivotally mounted at 22 and 23 to the truck chassis. The guide boom members are connected by cross braces 24 and 25. The guide boom members are movable between a vertically oriented storage position, as shown in FIG. 1 to a generally horizontal and fully deployed position, as shown in FIG. 3 by way of at least one first hydraulic cylinder 26 that is mounted to the chassis at 27, intermediate the cab and the hitch plate 13. Extendable from the cylinder 26 is a first piston rod 28 that is connected to the cross brace 24. Although only a single first hydraulic cylinder is shown in the drawings, two such cylinders may be used to control raising and lowering of the lift frame 20 with the piston rods of a pair of first hydraulic cylinders being pivotally connected to the guide boom members 21.

Slidably mounted within the guide boom members 21 are a pair of telescoping boom components 30 that have outer ends joined by cross connector frame 32. Movement of the telescoping boom components is controlled by at least one second hydraulic cylinder 34, with a single such cylinder being shown in the drawings. In the embodiment shown, the cylinder 34 is mounted at 35 to cross brace 24. A second piston rod 36 extends from the cylinder 34 and is connected at 38 to the frame 32. The frame 32 and the outer end of the second piston rod 36 are reinforced by bracing member 39.

Mounted to the connector frame 32 is a guide frame or forklift tower 40 having a pair of spaced guide rails 41 that are connected by reinforcing cross members 42, 43 and 44. The guide frame 40 is mounted so as to be generally perpendicular to the lift frame 20 and is movable with the telescoping boom components. A forklift device 45 is pivotally and slidably mounted relative to the guide frame 40 by a base slide member 46 having opposing plates 47 and 48 that extend on opposite sides of the guide rails 41 and which are connected by a flange member 49. A pair of spaced bearings 50 are mounted to the plate 48 in which are pivotally received an upper hollow cross tube 52 of the forklift device 45. The upper hollow cross tube is fixedly secured to a lower hollow cross tube 54 by a v-shaped brace 55.

The forklift device 45 has a rear frame 51 which includes the cross tubes 52 and 54 and which further includes side components 56 and 58 from which extend lift arms or forks 60 and 61. Each side component includes a pair of spaced tubes 62 and 63 that are slidably received within the hollow cross tubes 52 and 54 and which oppose similar tubes on the opposite side component.

Figure 2:
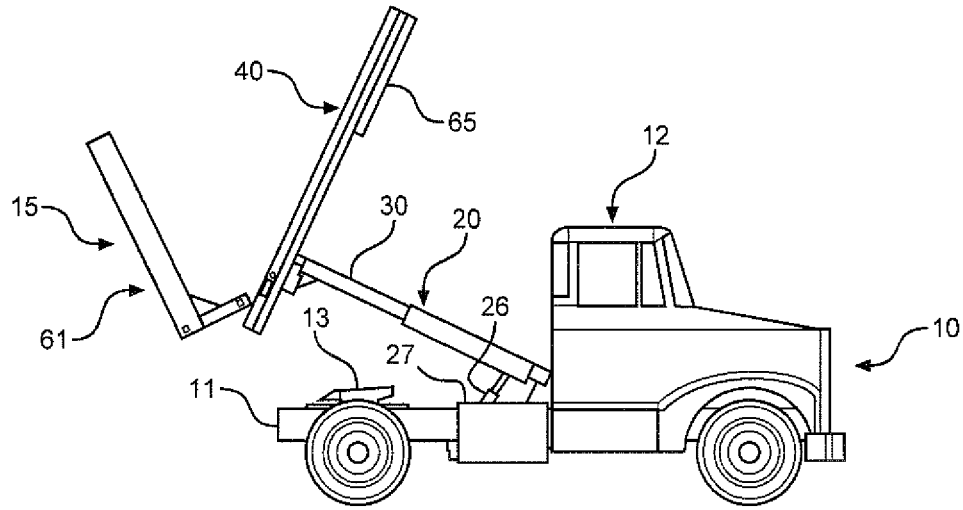
FIG. 2 is a view similar to FIG. 1 showing the forklift device being partially lowered toward a deployed position relative to the truck.
Figure 4:
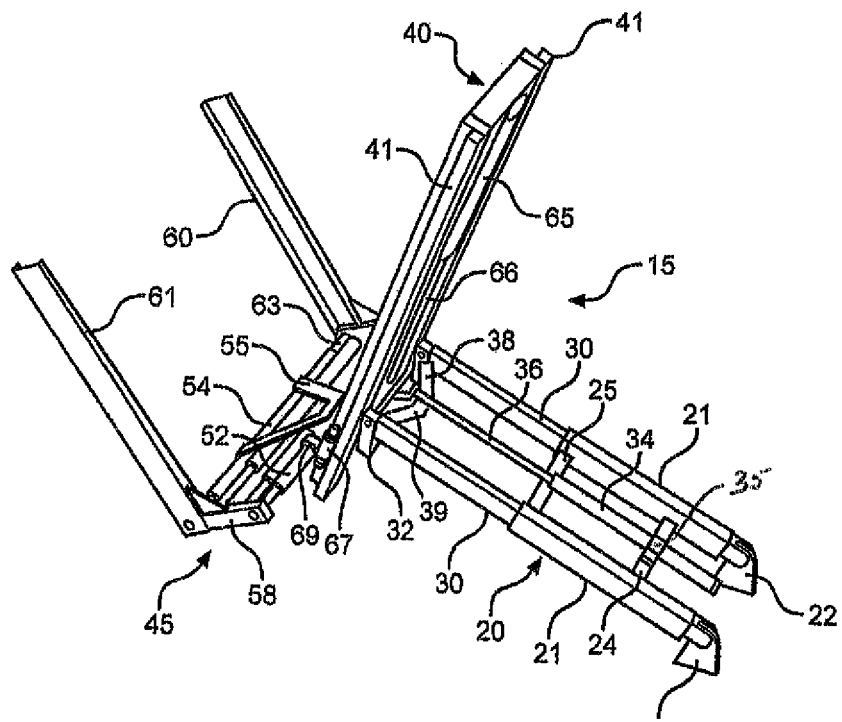
FIG. 4 is a rear perspective view of the forklift assembly of the invention.
Figure 5:
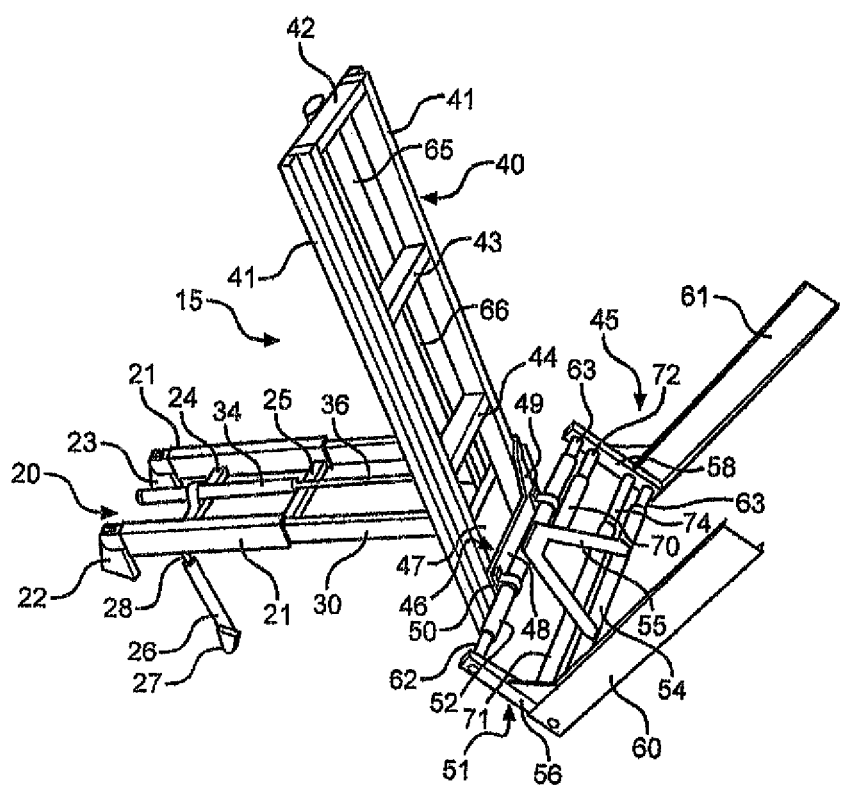
FIG. 5 is a front perspective view of the forklift assembly.
Figure 6:
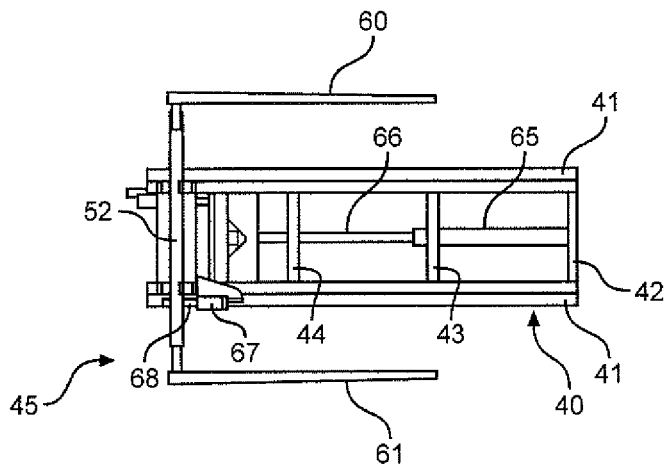
FIG. 6 is a top plan view of the forklift assembly in the position shown in FIG. 1.
Figure 7:
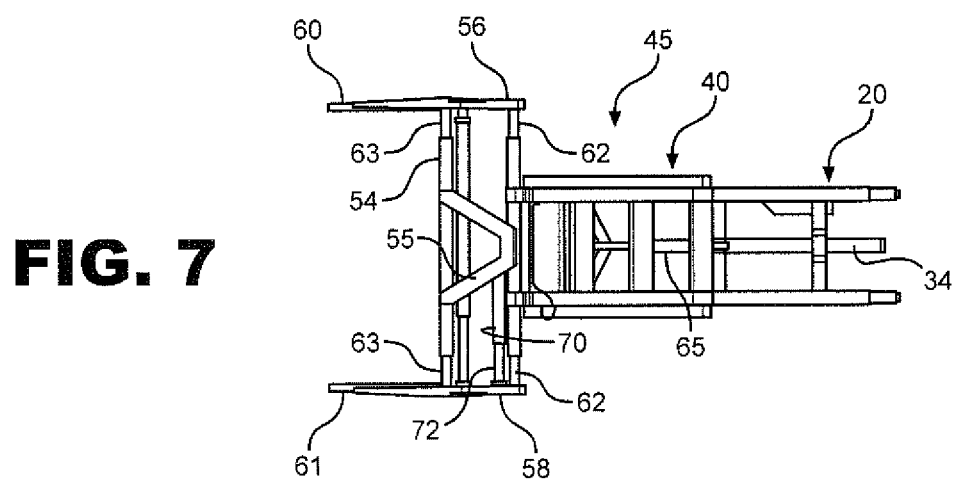
FIG. 7 is a top plan view of the forklift assembly in the position shown in FIG. 2.
Figure 8:
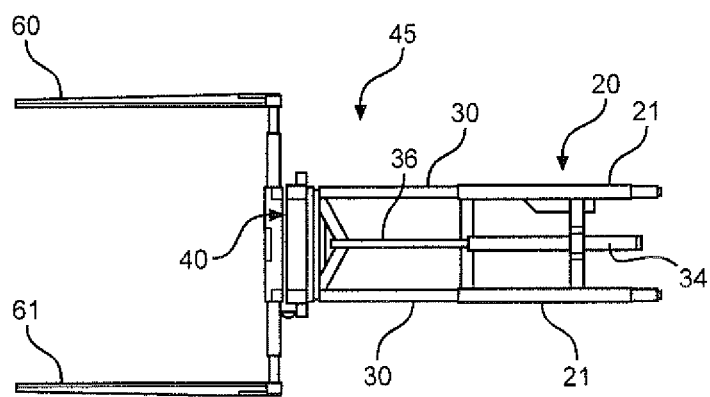
FIG. 8 is a top plan view of the forklift assembly in the position shown in FIG. 3.

The forklift device 45 is movable with the base slide member 46 along a portion of the height of the guide frame 40 and is controlled by at least one third hydraulic piston 65 that is mounted to the cross members 42 and 43 and from which extends a third piston rod 66. The third piston rod has an outer end connected to the base slide member 46 so that the base slide member moves with the third piston rod such that the forklift device is movable between a lowermost position as shown in FIGS. 2, 4 and 5 to an uppermost position as shown in FIG. 3. Although a single hydraulic cylinder 65 is shown in the drawings, two or more such cylinders may be used.

Pivotal movement of the forklift device in accomplished using at least one fourth hydraulic cylinder 67 with one such cylinder being shown as mounted to the flange member 49 of the slide member 46. A fourth piston rod 68 is extendable from the fourth hydraulic cylinder 67 and is connected to a collar 69 mounted to the upper cross tube 52 such that, by extension and retraction of the fourth piston rod, the upper cross tube will rotate within the bearings 50 thereby moving the forklift device by way of the v-shaped brace 55. The lift arms or forks 60 and 61 of the forklift device are movable between a stowed position generally parallel to the guide frame, as shown in FIG. 1, to a position generally perpendicular to the guide frame, as shown in FIG. 3.

The lift arms or forks 60 and 61 are also movable laterally relative to the rear frame 51 so that they are movable toward or away from one another using a pair of fifth hydraulic cylinders 70 and 71. Cylinder 70 is mounted to the v-shaped brace 55 and has a fifth piston rod 72 connected to the side component 58 and cylinder 71 is mounted to side component 56 and has a fifth piston rod 74 connected to the side component 58. By activation of the fifth hydraulic cylinders, the lift arms are moved toward or away from one another.

It should be noted that the number of forklift lift arms and the structure thereof may change but be within the teachings of the present invention. Also, in some instances, instead of the hydraulic cylinders, pneumatic or electric cylinders or gear drives and the like may be used to move the various components of the invention.

In order to control the various cylinders of the invention, controls and a separate operator seat are provided within the cab. The controls are connect with various valves which control the flow of hydraulic or other fluids carried by the truck to and from the hydraulic cylinders.

In use, with the trailer "T" disconnected from the truck, the forklift assembly 15 on the truck can be used to load and unload goods and material of substantially any type relative to the trailer. Thereafter, the forklift is placed in the stored position shown in FIG. 1 wherein the lift arms and guide frame are positioned over the cab of the truck. The truck is subsequently backed beneath the trailer such that the trailer hitch pin seats within the hitch plate or fifth wheel assembly of the truck and locked in position. The truck is thereafter used to transport the trailer to a destination, after which, the trailer can be disconnected from the truck and the truck used as a forklift vehicle to load or off-load goods and materials.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A combination transport and load handling vehicle comprising, a truck having a chassis with a cab mounted to a forward portion of the chassis and a hitch plate mounted toward the rear of the chassis, a forklift assembly including a lift frame having at least one first guide boom member pivotally mounted to the chassis adjacent a rear of the cab and at least one second extendable boom member which is reciprocally movable with respect to the at least one first guide boom member between a retracted position relative to the at least one first guide boom member and an extended position relative to the at least one guide boom member, the lift frame being pivotally movable between a generally vertical position adjacent the rear of the cab and a generally horizontal position extending over the hitch plate and beyond a rear of the chassis, the forklift assembly also including a forklift device having a guide frame mounted to the at least one second extendable boom member so as to be generally perpendicular to the lift frame and positioned beyond the rear of the chassis when the at least one second extendable boom member is in the extended position, a rear fork support frame pivotally mounted to the guide frame and being movable with respect to the guide frame, at least two forks mounted to extend perpendicularly to the rear fork support frame, and when the forklift device is not in use and the lift frame is raised to a vertical position adjacent the rear of the cab and the at least one second extendable boom member is withdrawn to the retracted position relative to the at least one first guide boom member, the lift frame and the forks of the forklift device are positioned generally parallel to, and in spaced relationship to and above, the cab such that the forklift assembly does not interfere with the use of the hitch plate.

2. The combination transport and load handling vehicle of claim 1 wherein the lift frame includes at least two spaced first guide boom members and at least two spaced second extendable boom members.

3. The combination transport and load handling vehicle of claim 2 wherein the forklift device includes at least one reciprocally movable piston pivotally mounted to the chassis and the lift frame for raising and lowering the lift frame relative to the cab and the hitch plate.

4. The combination transport and load handling vehicle of claim 2 wherein the guide frame includes at least a pair of spaced guide rails, and the forklift device being slidably mounted to the guide rails.

5. The combination transport and load handling vehicle of claim 4 including a first reciprocally movable piston mounted to the vehicle chassis for pivoting the lift frame relative to the chassis, a second reciprocally movable piston mounted to the lift frame for moving the at least two spaced second extendable boom members relative to the at least two first pivotal guide boom members, and a third reciprocally movable piston connected to the guide frame for moving the forklift device along the guide rails.

6. The combination transport and load handling vehicle of claim 5 including a fourth reciprocally movable piston mounted to the guide frame for pivoting the forklift device relative to the guide frame.

7. The combination transport and load handling vehicle of claim 6 wherein the at least two forks are adjustably spaced relative to one another.

8. The combination transport and load handling vehicle of claim 7 including a pair of fifth reciprocally movable pistons mounted to the forklift device for moving the at least two forks relative to one another.

9. The combination transport and load handling system of claim 8 wherein each of the first, second, third, fourth and fifth reciprocally movable pistons includes at least one hydraulic cylinder with a reciprocally movable piston rod.

10. The combination transport and load handling system of claim 9 including a trailer removably connected to the hitch plate.

11. The combination transport and load handling vehicle of claim 8 wherein the at least two forks are mounted to tubes slidably connected to cross tubes mounted to the rear fork support frame.

12. The combination transport and load handling system of claim 2 including reciprocally movable pistons operatively connected to each of the at least two forks for moving the at least two forks toward and away from one another.

13. The combination transport and load handling system of claim 1 including a trailer removably connected to the hitch plate.

14. A combination transport and load handling vehicle comprising, a truck having a chassis with a cab mounted to a forward portion of the chassis and a hitch plate mounted toward the rear of the chassis, a trailer selectively connected to the hitch plate, a forklift assembly pivotally mounted to the chassis intermediate the cab and the hitch plate, the forklift assembly including a lift frame having a first pair of pivotal guide boom members pivotally mounted to the chassis adjacent a rear of the cab and a second pair of extendable boom members reciprocally movable between a retracted position relative to the first pair of pivotal guide boom members and an extended position relative to the first pair of pivotal guide boom members, first piston means for pivoting the lift frame so as to be movable between a generally vertical position adjacent the rear of the cab and a horizontal position, second piston means for moving the second pair of extendable boom members between the retracted and extended positions such that the second pair of extendable boom members are extended from the rear of the chassis when in the extended position, the forklift assembly also including a forklift device including a guide frame mounted so as to be supported on and extend generally perpendicularly to the second pair of extendable boom members, a rear fork support frame pivotally mounted to the guide frame and being movable with respect to the guide frame, forks mounted to extend perpendicularly to the rear fork support frame, and when the lift frame is raised to the vertical position adjacent the rear of the cab and the second pair of extendable boom members moved to the retracted position relative to the first pair of pivotal guide boom members, the forks and the guide frame are in a stored position generally parallel to and above the cab such that the forklift assembly does not interfere with the use of the hitch plate, and a third piston means for raising and lowering the rear fork support frame relative to the guide frame and a fourth piston means for pivoting the forks from a deployed position generally perpendicular relative to the guide frame and the stored position wherein the forks are generally parallel to the guide frame.

\* \* \* \* \*